(12) United States Patent
Noe

(10) Patent No.: US 6,532,902 B2
(45) Date of Patent: Mar. 18, 2003

(54) DUCK SHOOTING RESORT LAYOUT AND DUCK TRAINING METHOD THEREFOR

(76) Inventor: Wendell Harold Noe, 2823 Hwy. 69, Lake City, AR (US) 72437-8603

( * ) Notice: Subject to any disclaimer, the term of this patent is extended or adjusted under 35 U.S.C. 154(b) by 0 days.

(21) Appl. No.: 09/901,233

(22) Filed: Jul. 9, 2001

(65) Prior Publication Data

US 2003/0015148 A1 Jan. 23, 2003

(51) Int. Cl.⁷ .................... A01K 15/02; A01M 31/00
(52) U.S. Cl. .................... 119/713; 119/221; 119/719; 119/721; 43/3
(58) Field of Search .................... 119/219, 713, 119/221, 719, 721; 43/3; 473/165

(56) References Cited

U.S. PATENT DOCUMENTS

| | | | |
|---|---|---|---|
| 1,409,227 A | 3/1922 | Maiwurm | |
| 4,029,049 A * | 6/1977 | Hillier | 119/200 |
| 5,560,615 A | 10/1996 | Van Der Mude | 273/444 |
| 6,347,908 B1 * | 2/2000 | Safwat | 119/219 |

* cited by examiner

Primary Examiner—Yvonne Abbott
(74) Attorney, Agent, or Firm—Walker, McKenzie & Walker, P.C.

(57) ABSTRACT

A duck shooting resort layout having a body of water, a peripheral embankment encircling the water, a duck hunting region within the resort, and duck hunting blinds within the hunting region from which hunters may shoot ducks. The resort includes trained ducks taught to fly only within the hunting region. Multiple embodiments, with islands, piers, or embankment fingers, are described that safely allow a high density of hunters within a given land area. A method of training ducks to fly only within the hunting region is described. A construction method for the resort layout is described that allows a terrain to be sculpted into the structure of the invention at a minimum of cost and movement of dirt. The water depth may increase toward the channel ends for harvesting fish by partial draining, and fish grading screens may be provided at the ends for harvesting fish.

2 Claims, 6 Drawing Sheets

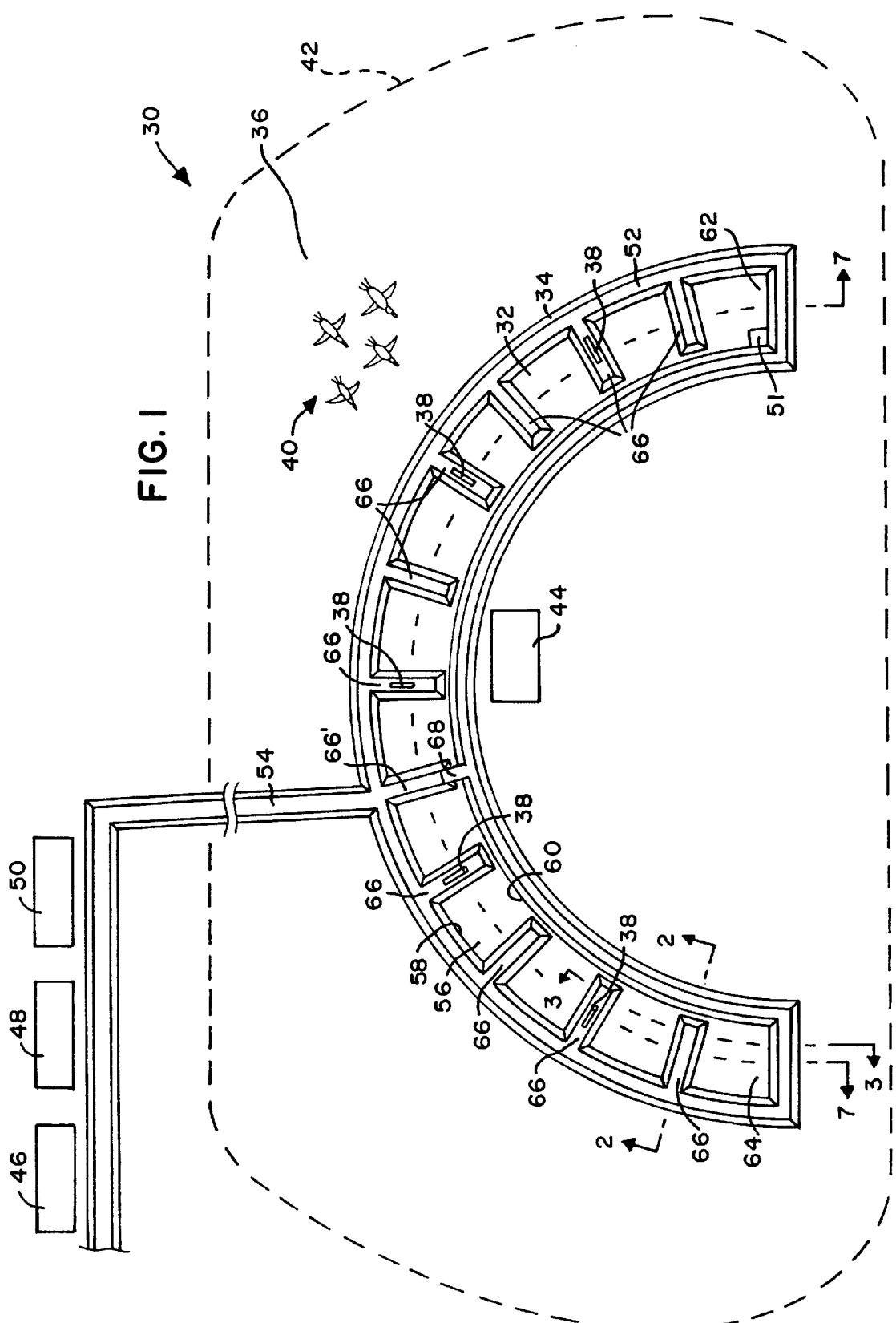

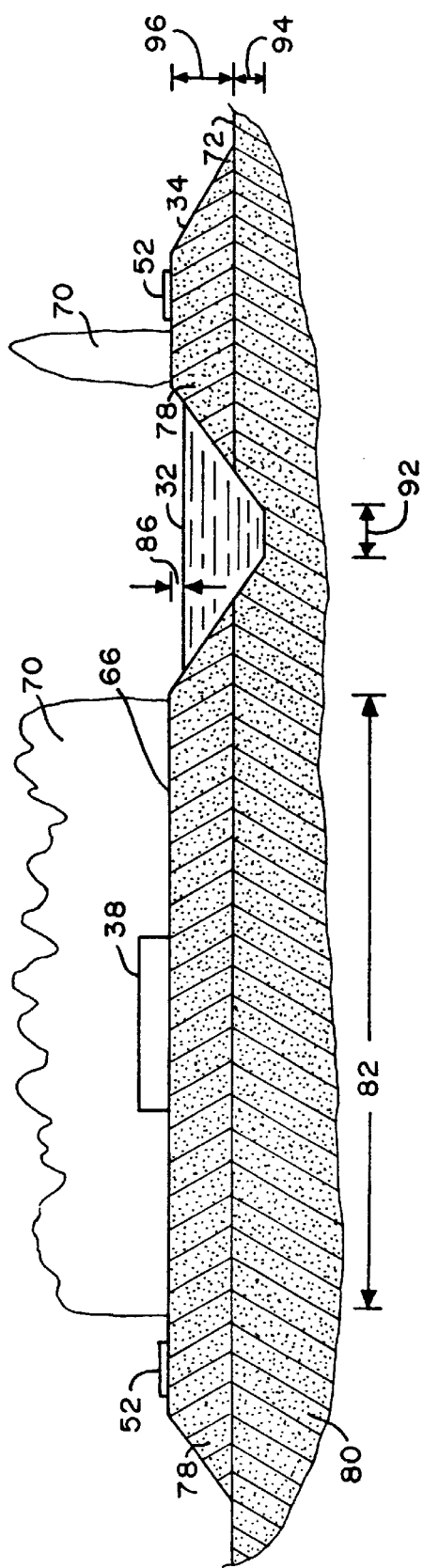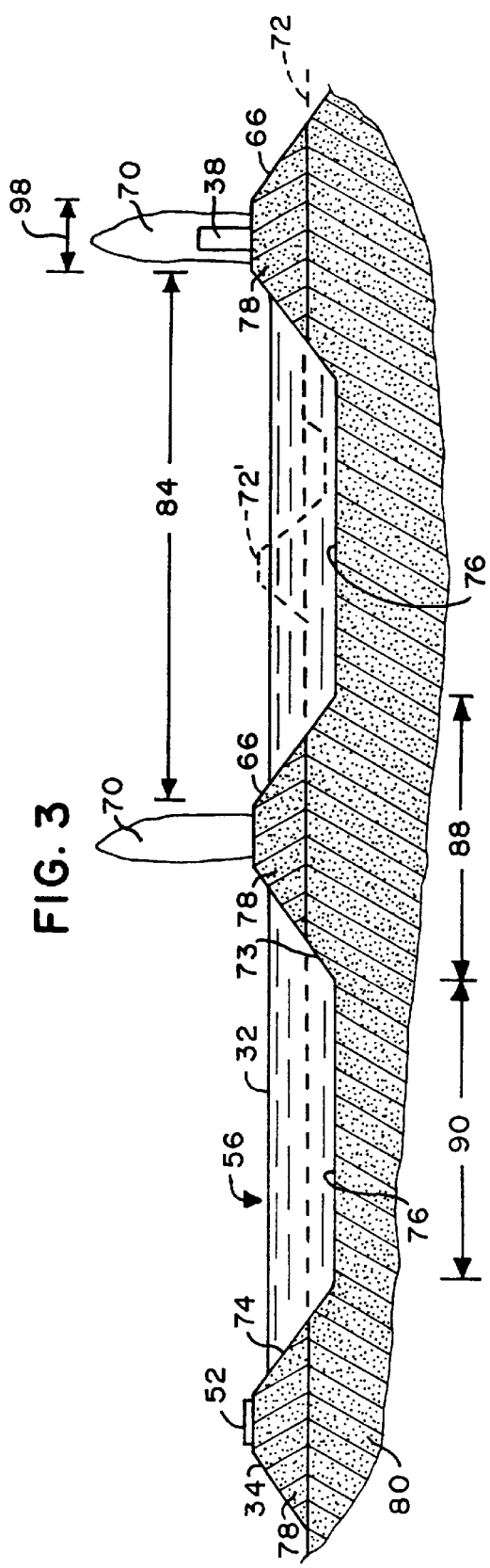

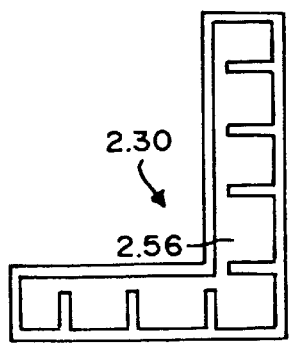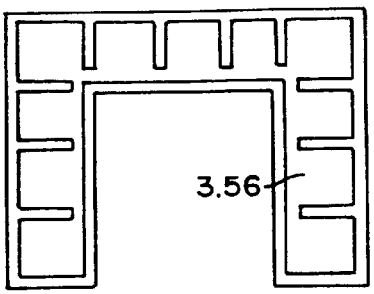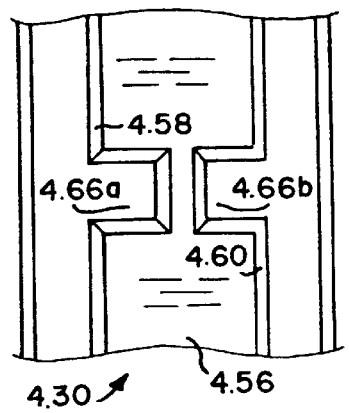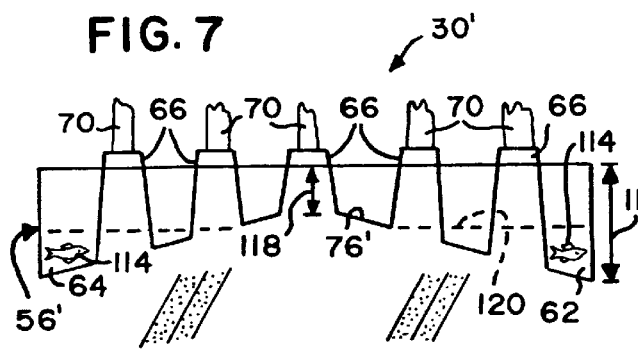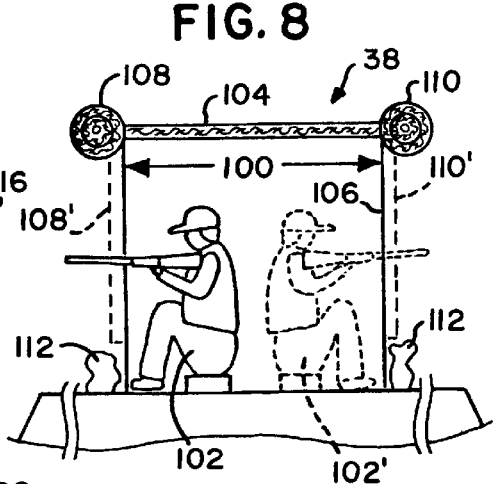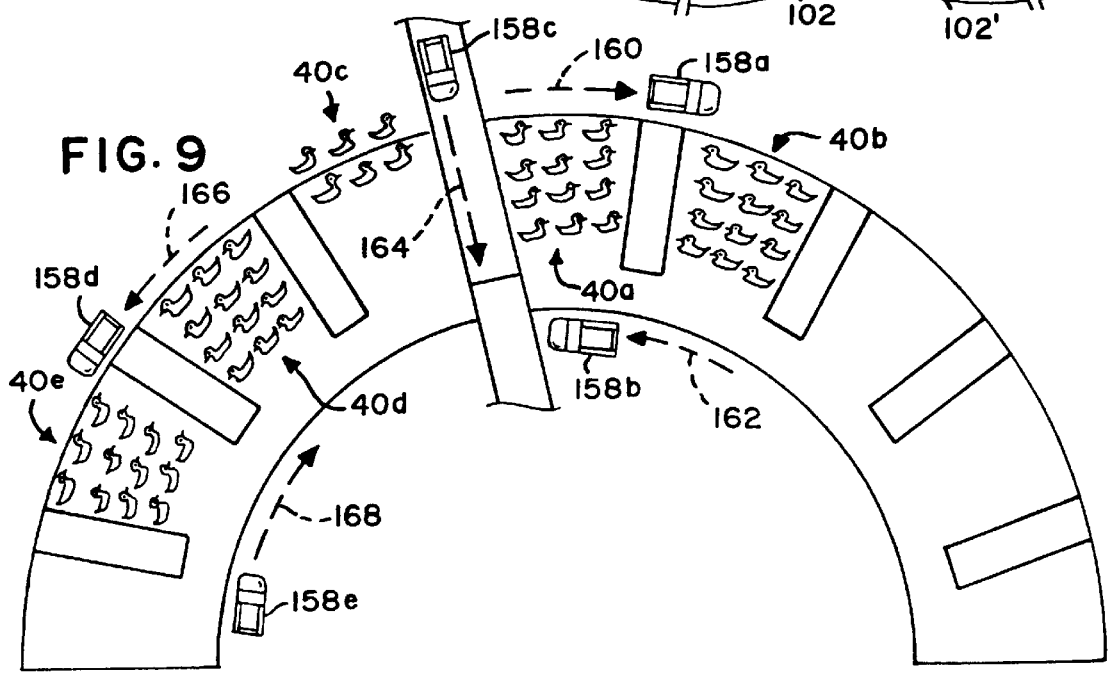

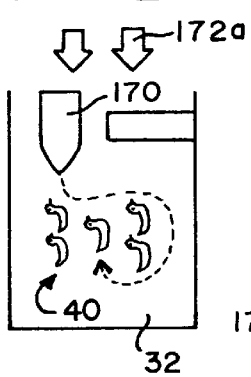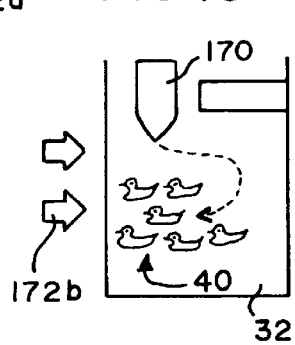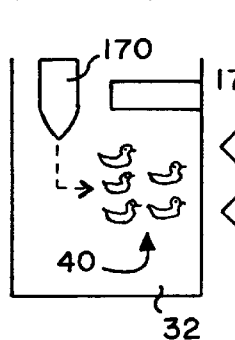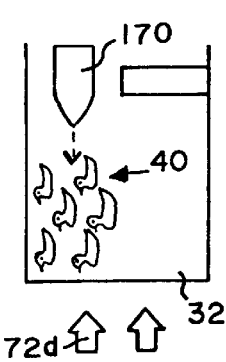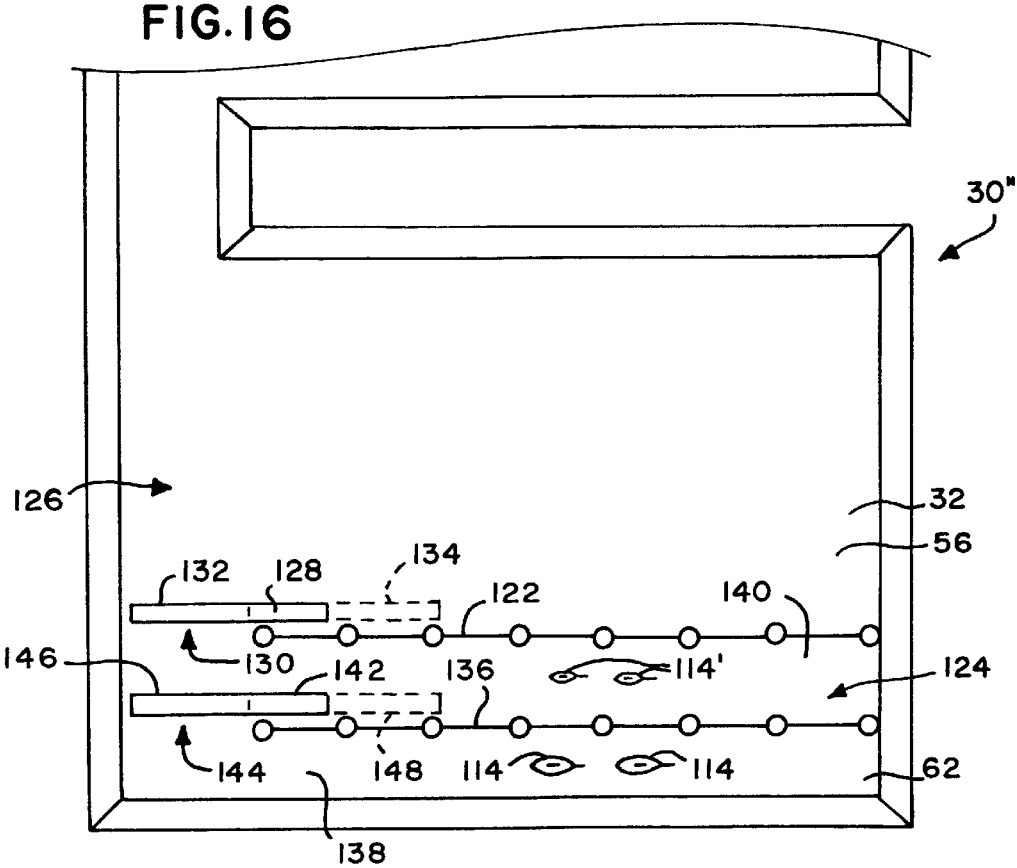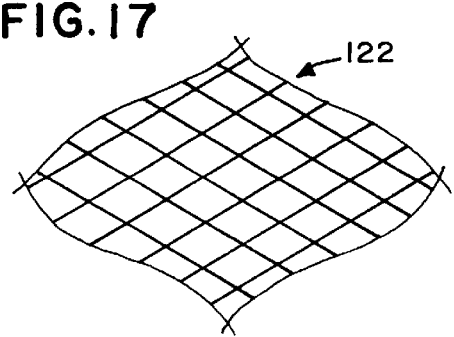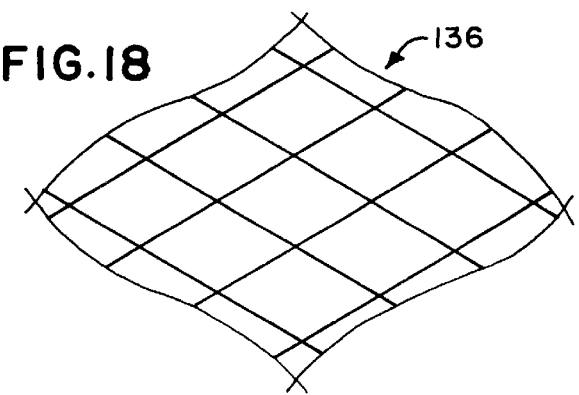

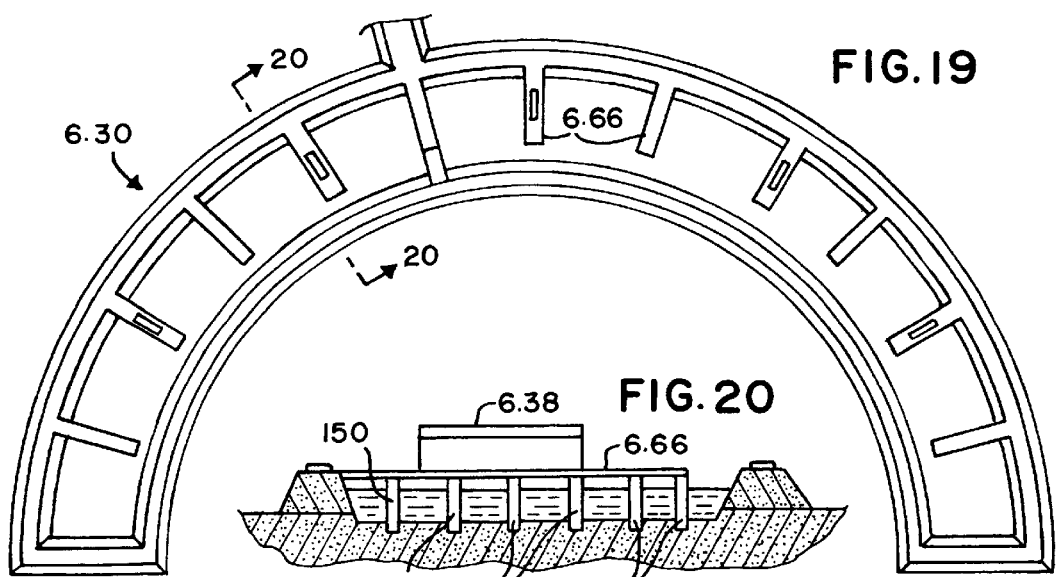
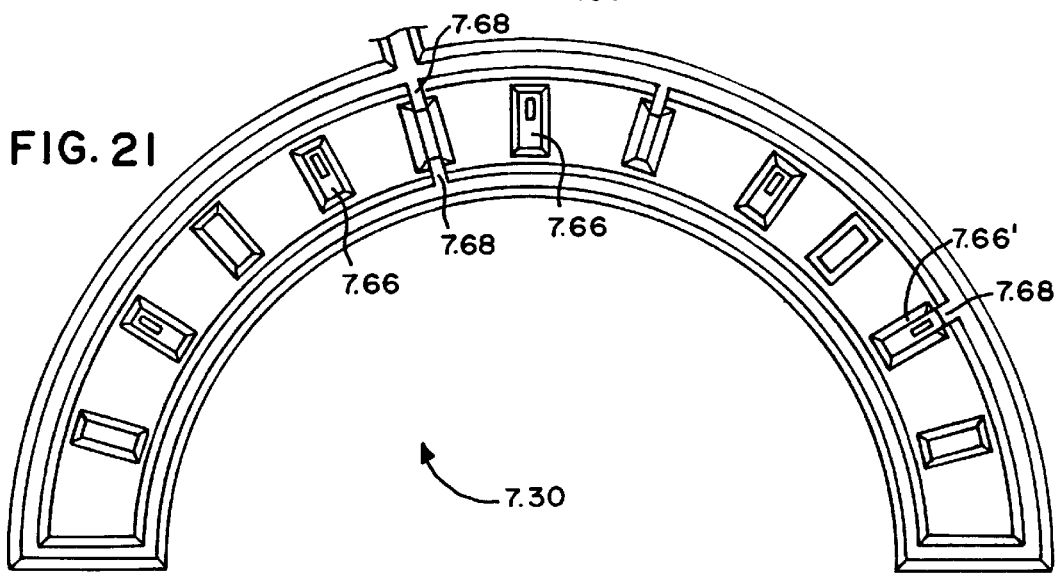
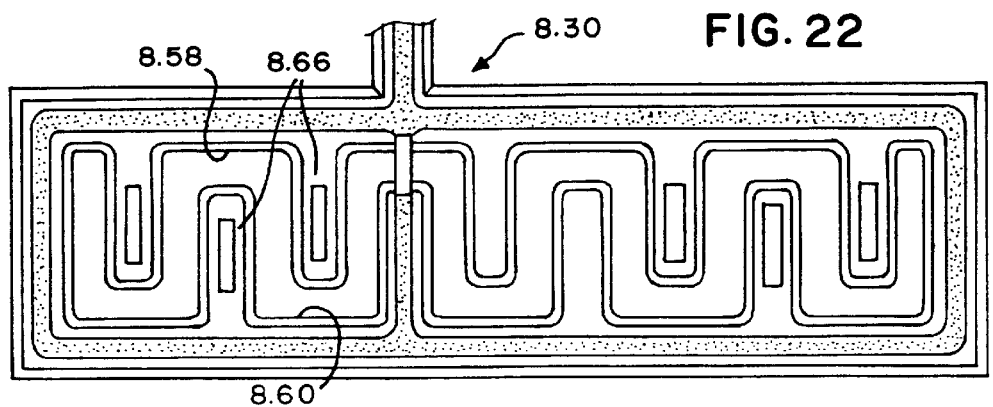

DUCK SHOOTING RESORT LAYOUT AND DUCK TRAINING METHOD THEREFOR

CROSS REFERENCE TO RELATED APPLICATIONS

Not applicable.

STATEMENT REGARDING FEDERALLY SPONSORED RESEARCH OR DEVELOPMENT

Not applicable.

REFERENCE TO COMPACT DISC(S)

Not applicable.

BACKGROUND OF THE INVENTION

1. Field of the Invention

The present invention relates, in general, to waterfowl hunting, and in particular, to a layout for a duck hunting preserve and a method for training ducks to fly within the preserve.

2. Information Disclosure Statement

It is often desired to provide a preserve within which hunters may shoot ducks, and it is also often desirable to fish in water provided in such a preserve. Prior art preserves are necessarily large and rather wasteful of land because groups of hunters must necessarily be separated by great distances so that they do not inadvertently shoot one another while shooting at the ducks. Furthermore, prior art duck hunting resorts rely on the unpredictable behavior of wild ducks, who only occasionally will venture into the hunting area when attracted by decoys and artificial duck calls. This unpredictability as to the presence of ducks can diminish the pleasure of hunting as hunters sit for hours without seeing a duck to shoot.

It is therefore desirable to have a duck hunting preserve that provides for higher density of hunters on a given area of land than heretofore possible. It is further desirable that such a duck hunting preserve provide a ready supply of ducks who remain in the preserve for shooting in a natural outdoor setting, without requiring any tethering or artificial restraint to retain the ducks within the preserve.

A preliminary patentability search in Class 43, subclasses 1 and 4.5, Class 273, subclasses 444, 447, and 140, and Class 473, subclass 466, produced the following patents, some of which may be relevant to the present invention: Van Der Mude, U.S. Pat. No. 5,560,615, issued Oct. 1, 1996; and Maiwurm, U.S. Pat. No. 1,409,227, issued Mar. 14, 1922.

None of these references, either singly or in combination, disclose or suggest the present invention.

BRIEF SUMMARY OF THE INVENTION

The present invention is a duck shooting resort layout having a body of water that is preferably an elongated channel, a peripheral embankment encircling and containing the body of water, a duck hunting region within the duck shooting resort layout and including at least a portion of the body of water, and preferably one or more duck hunting blinds within the duck hunting region from which duck hunters may shoot ducks. While prior art duck shooting resorts are well-known, a significant and non-obvious feature of the duck shooting resort layout of the present invention is the providing of trained ducks that have been taught to fly only within, and not outside, the duck hunting region. A variety of embodiments of the invention, with islands, piers, or embankment fingers in the body of water, are described that safely allow a high density of hunters to be accommodated within a given area of land. A method of training the ducks of the present invention to fly only within the duck hunting region has been experimentally tested and is described. A method of construction of the duck shooting resort layout is described that allows a terrain of land to be sculpted into the structure of the present invention at a minimum of cost and movement of dirt. A variation of the invention is provided in which the depth of the body of water increases substantially monotonically toward one or both ends of the body of water so that fish may be harvested by partially draining the body of water and forcing the fish to the deeper ends, and a second variation of the invention is provided with one or more fish grading screens being provided at the ends of the body of water to allow trapping and collection of different sizes of fish by the fish grading screens.

It is an object of the present invention to provide a duck hunting resort having trained ducks that have been taught to fly only within a certain duck hunting region. It is a further object of the present invention to provide a duck hunting resort that safely provides for a higher density of hunters within a given area of land than heretofore possible. It is a still further object of the present invention to provide multiple uses of the resort by allowing growing and harvesting of fish in the body of water within the resort.

BRIEF DESCRIPTION OF THE SEVERAL VIEWS OF THE DRAWING

FIG. 1 is a top plan view of a first embodiment of the duck shooting resort layout of the present invention.

FIG. 2 is a transverse elevational view through an embankment finger of the present invention, taken substantially along the line 2—2 shown in FIG. 1.

FIG. 3 is an elevational view through embankment,fingers of the present invention, taken substantially along the curved line 3—3 shown in FIG. 1.

FIG. 4 is a partial top plan view of a second embodiment of the duck shooting resort layout of the present invention.

FIG. 5 is a partial top plan view of a third embodiment of the duck shooting resort layout of the present invention.

FIG. 6 is a top plan view of a portion of a fourth embodiment of the duck shooting resort layout of the present invention.

FIG. 7 is a longitudinal elevational view through embankment fingers of a first variation of the present invention, taken substantially along the curved line 7—7 shown in FIG. 1.

FIG. 8 is a diagrammatic side view showing hunters in a blind atop an embankment finger of the present invention.

FIG. 9 is a diagrammatic plan view showing the daily progressive feeding method for training ducks of the present invention.

FIGS. 12–15 are partial top plan views of the duck shooting resort layout of the present invention, showing how to use a boat to force the ducks to fly into the wind.

FIG. 16 is a top plan view of one end of a second variation for all embodiments of the duck shooting resort layout of the present invention, showing sliding gates for entrapping fish in the water behind the fish grading screens.

FIGS. 17 and 18 are partial views of fish grading screens of the second variation of the present invention, showing differing mesh sizes of the fish grading screens.

FIG. 19 is a partial top plan view of a sixth embodiment of the duck shooting resort layout of the present invention.

FIG. 20 is an elevational view of a portion of the sixth embodiment of the duck shooting resort layout of the present invention, taken substantially along the line 20—20 shown in FIG. 19.

FIG. 21 is a partial top plan view of a seventh embodiment of the duck shooting resort layout of the present invention.

FIG. 22 is a partial top plan view of an eighth embodiment of the duck shooting resort layout of the present invention.

DETAILED DESCRIPTION OF THE INVENTION

Figure 10:
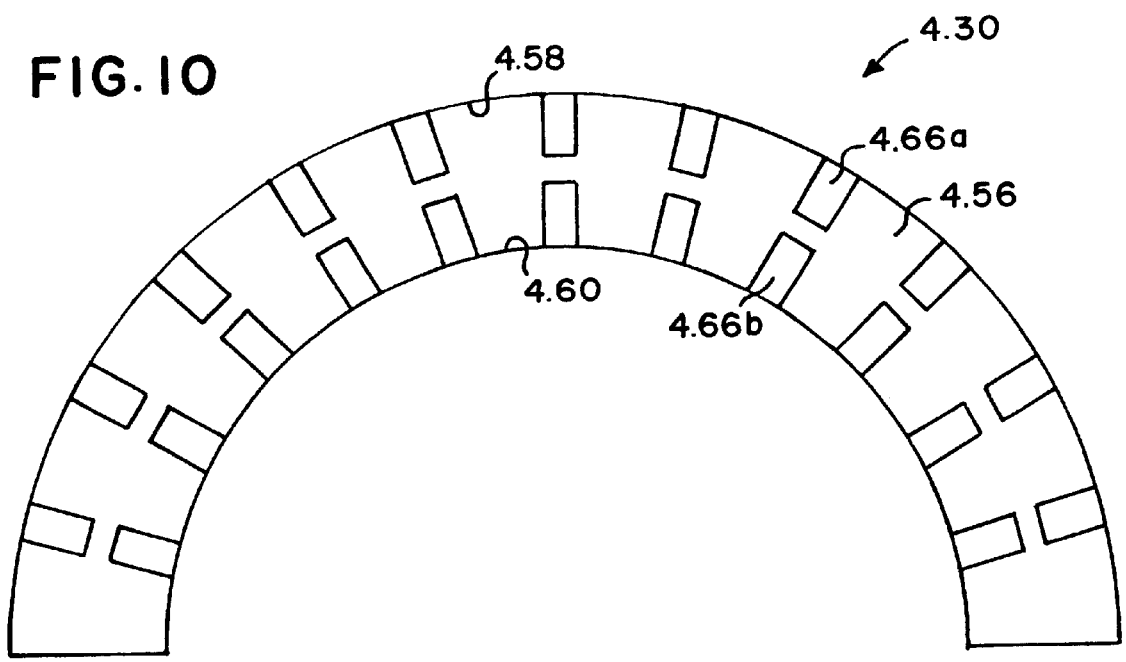
FIG. 10 is a partial top plan view of the fourth embodiment of the duck shooting resort layout of the present invention, a portion of which is shown enlarged in FIG. 6.

Referring to the drawing figures, a first embodiment 30 of the duck shooting resort layout of the present invention is shown in FIG. 1, and is seen to comprise a body of water 32, a peripheral embankment 34 encircling and containing the body of water 32, and a duck hunting region 36 within duck shooting resort layout 30 and including at least a portion, and preferably all, of body of water 32. Within the duck hunting region 36 is preferably provided, for comfort of hunters, at least one duck hunting blind 38 and preferably a plurality of such duck hunting blinds 38. An essential feature of all embodiments of the present invention is the inclusion within the duck shooting resort layout of a plurality of trained ducks 40 who have been taught to fly only within, and not outside, the duck hunting region 36, using a training method described hereinafter in great detail. Duck hunting region 36 may be selected to be any shape or size, but is bounded by a chosen hunting region perimeter 42 and is typically chosen to be an area such as about one-half to three-quarters of a mile (about 0.8 to 1.2 kilometers) in each direction from the body of water 32. It should be understood that the duck hunting region 36 need not necessarily extend the same distance in each direction from the body of water 32, and the training method of the present invention may be used to train ducks 40 to fly in almost any shape hunting region desired.

Preferably, all embodiments of the present invention will have one or more well-known dog kennels 44 for housing hunting dogs, and also may have outlying buildings 46, 48, 50 for offices, lodging, entertainment and relaxation, taxidermists, sale of hunting supplies, and consultation with hunting professionals, etc. A paved or gravel road 52 is preferably provided atop the peripheral embankment 34 for driving trucks and vehicles thereupon, with a connecting road 54 being provided to the buildings 46, 48, 50. Additionally, one or more duck trapping pens 51 may be provided at one or more locations along the body of water and accessible from the shore.

Peripheral embankment 34 preferably forms an elongated channel 56 holding body of water 32, with elongated channel 56 having first and second shores 58, 60 spaced apart from each other, and with elongated channel 56 further having first and second ends 62, 64 remote from each other.

The first embodiment 30 of the present invention includes at least one embankment finger 66, and preferably a plurality of embankment fingers 66, extending transversely across channel 56 from one of shores 58, 60, preferably with at least one, and preferably all, of the embankment fingers 66 having at least one of the duck hunting blinds 38 thereon for comfort and concealment of hunters. Preferably, one or perhaps more of the embankment fingers, such as embankment finger 66', includes a bridge 68 spanning therefrom to the other of the shores, thereby providing connectivity and passage over embankment finger 66' from one shore 58 to the other shore 60 and allowing vehicles to go quickly from one side of the channel to the other without having to take a circuitous route on road 52 around one of the ends 62, 64 of the elongated channel. It shall be understood that the reason that the embankment fingers 66, 66' do not extend fully from shore to shore is to allow ducks and fish within the body of water 32 to swim in the body of water from one end 62 to the other end 64, and to allow boats on the body of water to likewise traverse from one end 62 to the other end 64 by passing under bridge 68. Because of the unimpeded access provided to the entire channel, such boats can thus easily travel between various hunting blinds 38 and retrieve dead and crippled ducks that have been shot from the hunting blinds 38. The embankment fingers also provide additional shoreline for the body of water so as to allow greater fishing opportunities alongside the water.

Preferably, the embankment fingers 66 include trees and foliage cover 70 so as to protect one hunting blind 38 from being hit by shotgun shot from another hunting blind 38, and also to protect the embankment fingers 66 from wind and water erosion. The embankment fingers 66 with trees and foliage cover 70 also serve to protect the ducks from predators and the weather.

Referring especially to FIGS. 2 and 3, a preferred method of constructing the resort layout will now be described. Initially, before constructing the resort layout, the terrain surrounding and encompassing the area from which the peripheral embankment, embankment fingers, and elongated channel are formed has a first terrain surface contour represented schematically by surface contour line 72 showing the elevation of the first terrain surface contour, it being understood that the first terrain surface contour has a first averaged elevation. In the simple example case shown in FIGS. 2 and 3, in which the first terrain surface contour is assumed to be horizontal, the first terrain surface contour and the first averaged elevation are understood to both be represented by the same contour line 72, but in the usual case where the first terrain surface contour is not perfectly horizontal, as, for example, shown by partial contour line 72', the variations in elevation of the first terrain surface contour may be averaged, in a manner well known to those skilled in the art, to a first averaged elevation 72. After formation of the peripheral embankments, the formed terrain has a second terrain surface contour 73 up and down along the upper surface of peripheral embankment 34 and its downward sloping shore 74, then along the bottom 76 of the channel 56, then up and down the surface of embankment finger 66, then again along the bottom 76 of the channel 56, then again up and down the surface of the next embankment finger, etc., it being understood that the peripheral embankment, embankment fingers, and channel are formed by moving earth from one place to another, sculpting the first terrain surface contour into the desired second surface contour. Simply for clarity in explanation, the moved earth 78 is shown with one shading in FIGS. 2 and 3, and the unmoved earth 80 is shown with a different shading in FIGS. 2 and 3. It will be understood, however, that because earth is simply moved from one place to another to sculpt the hunting resort layout from the original terrain contour, the first averaged elevation 72 will be substantially equal to the second averaged elevation, and both will thus be represented by the same averaged contour line 72. Civil engineering computer programs are well known that can compute the required movement of earth to sculpt a given first terrain surface contour into the desired second terrain surface contour of the present invention.

For example, when channel 56 is constructed in a semi-circular fashion as shown in FIG. 1, a typical diameter for the semi-circle may be 2700 feet (823 meters). Assuming a flat (horizontal) first surface contour for the terrain, one solution for the second surface contour, in which the downward slope for the sides of the embankment fingers 66 and the peripheral embankment 34 is chosen to be a gentle ratio of 1:5 (i.e., a vertical rise that is ⅕ the horizontal run), would yield a typical length 82 for an embankment finger 66 of about 205 feet (62 meters), a distance 84 from one embankment finger 66 to another of about 300 feet (91 meters), with the top of an embankment finger 66 being a height 86 of about 1.5 feet (0.46 meters) above the surface of the water 32. Such a solution would produce a width 88 of embankment fingers 66, as measured at the channel bottom 76, of about 90 feet (27 meters), and would produce a longitudinal distance 90 between the peripheral embankment 34 and the last embankment finger 66 on each end of channel 56, as well as between adjacent embankment fingers 66, as measured along the channel bottom 76, of about 255 feet (78 meters), and a transverse distance 92 between each embankment finger 66 and the peripheral embankment 34 on the opposite shore, as measured along the channel bottom 76, of about 15 feet (4.6 meters). Such a solution produces a channel bottom 76 that is a distance 94 below the first and second averaged elevations 72 of about 2.45 feet (0.75 meters), and distance 96 of the top of peripheral embankment 34 and embankment fingers 66 above the first and second averaged elevations 72 of about 3.55 feet (1.08 meters), yielding, by simple arithmetic, a distance of about 6 feet (1.8 meters) from the top of peripheral embankment 34 and embankment fingers 66 to the channel bottom 76 and a water depth of about 4.5 feet (1.4 meters). With such slopes and distances, the transverse width 98 of each embankment finger 66 will be about 30 feet (9.1 meters). Of course, other solutions for variations of the structure of the present invention are readily obtained using well-known civil engineering computer programs, simply by varying the channel width, embankment finger length, channel depth, etc.

Referring to FIG. 8, a typical hunting blind 38 is shown having a typical transverse width 100 of about 8 feet (2.4 meters) so as to comfortably accommodate a duck hunter 102. Preferably the blind 38 may have a longitudinal length of about 28 feet (8.5 meters) so as to comfortably accommodate up to ten hunters 102 side-by-side with their hunting equipment. The blind 38 preferably has a tarpaulin cover 104 mounted upon a well-known frame 106, with cover 104 having first and second sides 108, 110 that may be rolled up as shown to allow shooting out of the blind or that may be draped down in an unrolled state 108', 110' so as to prevent shooting out of the blind on one side or to block wind or rain from entering the blind 38. Under instruction from a guide at the hunting resort, and for safety, the hunters 102 will be instructed to either unroll one side or the other of the tarpaulin cover 104 so that hunters in blinds 38 on adjacent embankment fingers will not be shooting at one another. In other words, under instruction from the guide, the hunters 102 will shoot out one side of the blind or, again under instruction from the guide, the hunters may shoot out the alternate side of the blind as shown by the alternate shooting position of hunter 102'. Preferably, the ground cover around the blinds 38 may include bushes 112 to further conceal the blinds 38 from ducks.

Referring to FIG. 7, a first variation 30' of all embodiments of the present invention is shown in which the body of water 32 is stocked with a plurality of fish 114, and further in which the channel bottom 76', rather than being horizontally flat, is sloped toward one or both ends to allow harvesting of the fish 114 in a manner that will now be described.

In this first variation 30', the elongated channel 56' still has first and second ends 62, 64 as before, and the elongated channel has a first depth 116 adjacent first end 62 and has a second depth 118 intermediate first and second ends 62, 64, with first depth 116 being greater than second depth 118, and in which the elongated channel 56' has a depth that decreases substantially monotonically from the first depth 116 to the second depth 118. It shall be understood that the channel 56' may either have a symmetrical sloping bottom that increases in depth from the middle of the channel 56' as shown toward both ends 62, 64, or else a minimum second depth 118 may be adjacent second end 64 and the channel bottom will slope monotonically from second end 64 to first end 62. When harvesting of fish 114 is desired, channel 56' is drained to a reduced level of water 120 so as to drive fish 114 to the deeper end 62 and away from the shallower portions of channel 56', and the fish can then be easily harvested from the partially-drained channel 56'.

Referring to FIGS. 16–18, a second variation 30" of all embodiments is shown in which the body of water 32 is also stocked with fish 114, 114', but which allows harvesting of the fish without having to drain the channel. In this second variation, elongated channel 56 has a first meshed fish grading screen 122 extending transversely across the elongated channel 56 adjacent first end 62 so as to separate elongated channel 56 into a first portion 124 at first end 62 and into a second portion 126 remote from first end 62. As shown in FIG. 17, first meshed fish grading screen 122 has a certain first mesh opening size chosen so that fish larger than the first mesh opening size cannot pass through first meshed fish grading screen 122 and will be entrapped thereby, and so that fish smaller than the first mesh opening size may pass through the first meshed fish grading screen. First meshed fish grading screen 122 further includes well-known selectably openable first gate means 128 for selectably creating a first unmeshed opening 130 within first meshed fish grading screen 122 so that all fish may pass therethrough. Gate means 128 preferably is slidably openable and closeable as shown, by any well-known mechanical or manual means, moving from a closed position 132 to an opened position 134.

Likewise, in this second variation of the present invention, elongated channel 56 further preferably has a second meshed fish grading screen 136 extending transversely across the elongated channel 56 and interposed between first meshed fish grading screen 122 and first end 62 so as to separate first portion 124 of channel 56 into a first subportion 138 at first end 62 and into a second subportion 140 adjacent first meshed fish grading screen 122. As shown in FIG. 18, second meshed fish grading screen 136 has a certain second mesh opening size, larger than the first mesh opening size of first meshed fish grading screen 122, with the second mesh opening size being chosen so that fish larger than the second mesh opening size cannot pass through second meshed fish grading screen 136 and will be entrapped thereby, and so that fish smaller than the second mesh opening size may pass through the second meshed fish grading screen 136. Like first meshed fish grading screen 122, second meshed fish grading screen 136 further includes similar well-known selectably openable second gate means 142 for selectably creating a second unmeshed opening 144 within second meshed fish grading screen 136 so that all fish may pass therethrough. Gate means 142 preferably is slidably openable and closeable as shown, by any well-known mechanical or manual means, moving from a closed position 146 to an opened position 148.

To harvest fish using this second variation of the present invention, first and second gate means 128, 142 are both opened to their respective opened positions 134, 148. Fish food is then placed adjacent end 62 of channel 56. Fish, attracted by the fish food, will gather at end 62 of channel 56. Gates 128, 142 are then both closed to their respective closed positions 132, 146. The larger fish 114 will be trapped within first subportion 138, and smaller fish 114' will pass through second fish grading screen 136 and will be trapped within second subportion 140. Still smaller fish, too small to harvest, will pass through first fish grading screen 122 and out into the second portion 126 of the channel 56, where they may be harvested at a later date after they have grown larger.

It shall be understood that the capacity of the duck hunting resort can be easily expanded, when desired, simply by extending the channel at one or both ends and by providing additional embankment fingers across the extended elongated channel.

Second, third, fourth, fifth, sixth, seventh, and eighth alternate embodiments of the present invention are shown in FIGS. 4–6, 10–11, and 19–22. Identifying reference designators for the second, third, fourth, fifth, sixth, seventh, and eighth embodiments are marked similarly to the first embodiment, except with the respective prefixes "2.", "3.", "4.", "5.", "6.", "7.", and "8.". It shall be understood that many aspects of all embodiments are substantially the same, and only the differences will be treated in detail, it being understood that similar structural features of the various embodiments perform similar functions. The significant difference between all embodiments is the shape of the elongated channel and the variations of the structures that, in the first embodiment, are the embankment fingers 66, 66'.

A second embodiment 2.30 of the present invention is shown in FIG. 4. The significant difference between first embodiment 30 and second embodiment 2.30 is that, in second embodiment 2.30, the elongated channel 2.56 is "L-shaped" rather than being semi-circular as in the first embodiment 30.

A third embodiment 3.30 of the present invention is shown in FIG. 5. The significant difference of the third embodiment 3.30 is that the elongated channel 3.56 is "C-shaped" rather than being semi-circular or "L-shaped".

A fourth embodiment 4.30 of the present invention is shown in FIGS. 6 and 10. The significant difference of the fourth embodiment 4.30 from the first embodiment 30 is that, in fourth embodiment 4.30, embankment half-fingers 4.66a, 4.66b extend transversely across channel 4.56 from opposite shores 4.58, 4.60, with a gap being between the opposing embankment half-fingers 4.66a, 4.66b rather than between each embankment finger 66 and the opposite shore's peripheral embankment 34.

Figure 11:
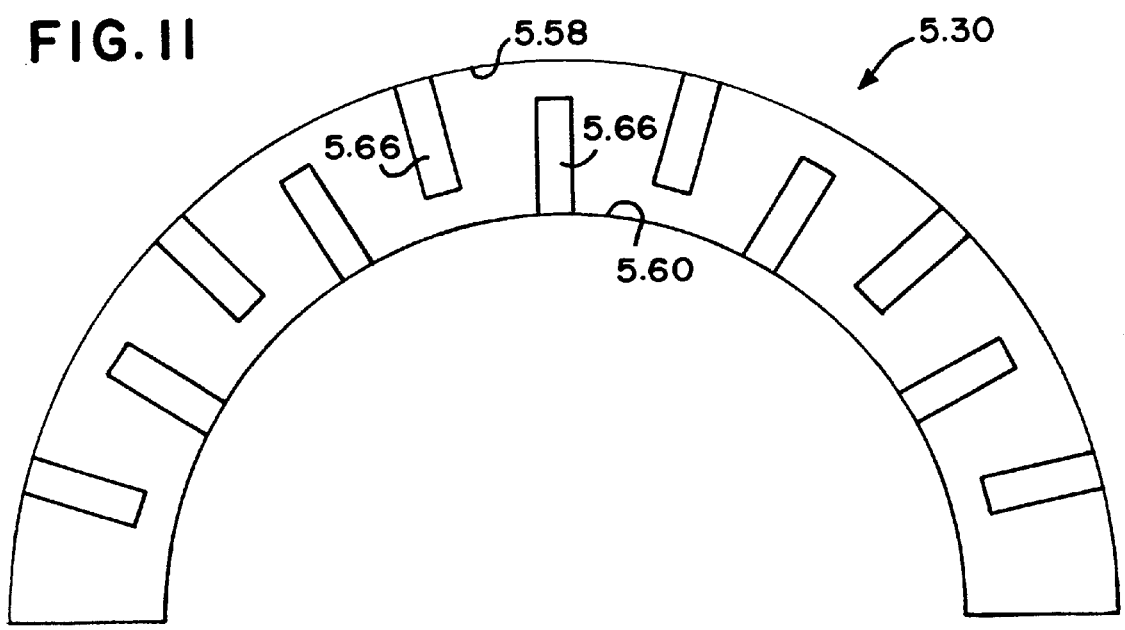
FIG. 11 is a partial top plan view of a fifth embodiment of the duck shooting resort layout of the present invention.

A fifth embodiment 5.30 of the present invention is shown in FIG. 11. The significant difference between the fifth embodiment 5.30 and the first embodiment 30 is that, in the fifth embodiment 5.30, the embankment fingers 5.66 respectively extend alternately from first and second shores 5.58, 5.60.

A sixth embodiment 6.30 of the present invention is shown in FIGS. 19 and 20. The significant difference between the sixth embodiment 6.30 and the first embodiment 30 is that, in the sixth embodiment, wooden or concrete piers 6.66, supported by a plurality of wooden or concrete pillars or posts 150 are substituted for embankment fingers 66, with duck hunting blinds 6.38 preferably being located on and supported by piers 6.66.

A seventh embodiment 7.30 of the present invention is shown in FIG. 21. The significant difference between the seventh embodiment 7.30 and the first embodiment 30 is that, in the seventh embodiment 7.30, islands 7.66, 7.66' are substituted for the embankment fingers 66 of the first embodiment. Some or all of the islands 7.66' may have one or more bridges 7.68 extending from the islands to the peripheral embankment so that the islands may be accessed without using a boat.

An eighth embodiment 8.30 of the present invention is shown in FIG. 22. The significant difference between the eighth embodiment 8.30 and the other embodiments is that, in the eighth embodiment, the channel 8.56 is serpentine with alternate embankment fingers 8.66 extending from opposite shores 8.58, 8.60.

It shall be understood that other aspects of all embodiments are similar, and all embodiments may have the variation of the fish grading screens and sloped bottoms, etc., and the embankment fingers, islands, piers, and various configurations of the different embodiments may be readily combined, if desired, in a manner that will now be apparent, to provide a variety of enjoyable hunting configurations in a single resort layout.

It should be emphasized that, in all embodiments of the present invention, the trained ducks 40 stay within the hunting region 36 only because of their training, described hereinafter, and not because of cages or tethers or the like.

Referring to FIG. 9, the present invention's preferred method of training the ducks can now be described. It is well-known that ducks cannot fly until they are about seven weeks old. Accordingly, once the duck shooting resort layout of the present invention has been provided, the young ducks are released into the resort when the ducks are less than twelve weeks old, and preferably when they are about four weeks old so as to provide about three weeks of preliminary training before the ducks begin to fly. During this preliminary training period, the ducks are only able to swim or waddle on the land, and during the first week following release, the ducks are fed each day at the same point at which they were released, each time accompanying the feeding with a certain loud noise so that the ducks come to associate the loud noise with the feeding.

The ducks are then fed on successive days within the duck hunting region while continuing to accompany the feeding with the certain loud noise so that the ducks continue to associate the loud noise with the feeding. Following this initial first week, the feeding point is then moved, from day to day, over an expanding area, until the ducks have become accustomed and trained to being fed over the entire duck hunting region. While the particular certain loud noise chosen is somewhat arbitrary, it is important that it be substantially the same noise from day to day so that the ducks become accustomed to the noise and come to associate the noise with feeding time. It is also important not to choose a noise such as the horn of a truck or vehicle, because the ducks might then become attracted to the sound of vehicles in a parking lot adjacent the buildings 46, 48, 50 shown in FIG. 1, and would quickly become disappointed when vehicle horns were not always accompanied by food. A particularly good choice of the loud noise has been experimentally found to be a well-known coach's whistle as is often used in sporting events.

Using the position of ducks 40a as an example starting point for the second week of training, a vehicle 158a is loaded with duck feed and driven to the ducks 40a, the certain loud noise is made, alerting the ducks that feeding time is near, and the vehicle will then be driven along a path 160. The ducks will follow the vehicle, expecting food, and should be taken as far as they will follow the vehicle. Once the ducks stop following the vehicle, the driver should back the vehicle up to the ducks and feed them.

On the next day, using the position of ducks 40b as an example starting point, vehicle 158b is loaded with duck food, the certain loud noise is made, and the ducks will then follow the vehicle 158b along a different path 162. It should be understood that preferably the same vehicle is used on every day of training, and the ducks will come to associate both the vehicle and the certain loud noise with feeding, and will approach that vehicle expecting food every time the certain loud noise is heard by the ducks. Likewise, on the third, fourth, and fifth days, example ducks 40c, 40d, and 40e respectively follow the vehicle 158c, 158d, and 158e along respective paths 164, 166, 168 as the ducks become trained to be fed at different locations within the duck hunting region. The feed should be scattered when issued so that all ducks may feed at about the same time. As time progresses, the vehicle can move the feeding locations to positions farther and farther from the body of water, until, as the ducks grow older and begin to fly, the ducks will fly over the entire hunting area and not beyond. This pattern of feeding in various locations should be continued so that the ducks remain accustomed to being fed over the entire duck hunting area.

A well-bred mallard duck will begin flying a few feet at about seven weeks of age, and this is the age at which the ducks should be introduced to motor boats. Using a motor boat, a duck herder should then begin driving or herding the ducks into the wind so that they begin to take off into the wind. Referring to FIGS. 12–15, a boat 170 with a duck herder in it is preferably provided to cause the ducks 40 to fly, in a manner shown in FIGS. 12–15 for four variations 172a, 172b, 172c, 172d, of wind directions. In all cases, the ducks 40 are urged to fly into the wind by using the boat 170 to come up behind the ducks 40, as shown by the dotted outline path taken by the boat 170, and drive the ducks 40 into flight into the wind. The duck herder may need to vary the speeds of the boat's motor in order to scare the ducks into flight, or may need to wave a boat paddle at the ducks, or to throw decoy dummies at the ducks so as to provoke the ducks into flight. About ten to fifteen minutes of exercise a day should be sufficient. Once the ducks become about twelve weeks old, the training regimen of this daily exercise and feeding at different locations accompanied by the certain loud noise will cause the ducks to be flying the entire gamut of the duck hunting area in accordance with their training. At about twelve to fourteen weeks of age, the mallard drake will begin getting his bright coloring.

The training schedule for the ducks should be arranged so that the ducks become fully trained shortly before the duck hunting season begins. Once the ducks become fully trained and the hunting season has begun, the ducks still need to be fed each day but the certain loud noise no longer needs to accompany the feeding.

Once the duck hunting resort layout has been constructed and the ducks have been trained in accordance with the method of the present invention, and when the duck hunting season is open, preparation is generally required in order to provide maximum hunting enjoyment to the hunters. About thirty minutes before the hunters arrive at the blinds for hunting, duck herders should board two small boats and drive the ducks to a chosen one of ends 62, 64 of the channel 56 (but not to both ends). The ducks will swim or fly to the chosen end of the channel 56 by the coaxing of the duck herders. Resort guides will then open the one of the sides 108, 110 of the blinds 38 that is facing the chosen end of the channel 56 into which the ducks have been herded. To maximize the thrill and fairness of hunting, care should be taken not to let the hunters view the herding of the ducks to the chosen end of the channel. Once the ducks have been herded into the chosen end of the channel, the hunters 102 are then driven to the various blinds 38 or hunting locations along road 52 and are instructed to enter the blinds 38 and prepare for the hunt.

Preferably there will be one guide and one dog in each blind that has hunters in it. Additionally, for about every two or three blinds 38, preferably there will be a boat on the body of water with one duck herder and a dog in it to control the ducks and pick up crippled and dead ducks for the blinds 38 assigned to that boat.

During the hunt, the ducks 40 may need to be controlled to provide a more pleasurable hunting experience to the hunters. About ninety percent of the time, once trained, the ducks will get up and fly over the duck hunting region on their own. Most of the time, as the ducks tire of flying, they will return to the water where they float and rest, but otherwise will fly within the duck hunting region for which they have been trained. The ducks will prefer to light in the water where other ducks can be seen and where they hear the contented calls of other ducks. Accordingly, hunters will place decoys in the channel 56 proximate their blind 38 and then make simulated duck noises using well-known duck call devices so as to attract the tiring ducks to the decoys for shooting by the hunters. Ducks are athletes, and prefer to fly the first two or three hours in the morning and the last two or three hours in the afternoon. Accordingly, if both morning and afternoon hunting sessions are to be provided, the ducks must be allowed to rest between about 10:00 a.m. until about 2:00 p.m., and the ducks must be fed during this mid-day rest period.

Occasionally, the ducks must be encouraged to fly. As in training, one boat 170 with a duck herder in it is preferably provided to cause the ducks 40 to fly when needed, in a manner shown in FIGS. 12–15 for four variations 172a, 172b, 172c, 172d, of wind directions. In all cases, the ducks 40 are urged to fly into the wind by using the boat 170 to come up behind the ducks 40, as shown by the dotted outline path taken by the boat 170, and drive the ducks 40 into flight into the wind. The ducks 40, being trained, will then fly within the pre-taught hunting region and provide the hunters with a pleasurable hunting experience.

Preferably, the duck hunting safety rules as shown in Table 1 shall be posted in the blinds and on the grounds of the resort, and shall be enforced to ensure safety of the hunters and a pleasurable hunting experience:

TABLE 1

| Duck Hunting Safety Rules |
| --- |
| 1. Shooting allowed from blinds only. |
| 2. Obey the guide at all times. |
| 3. No shooting when sitting down. |
| 4. When sitting down, unload your gun. |
| 5. Do not load guns before entering blinds. |
| 6. Unload guns before leaving blinds. |
| 7. No shooting ducks on water without permission. |

TABLE 1-continued

Duck Hunting Safety Rules

| | |
|---|---|
| 8. | Watch for boats, guides, and dogs. |
| 9. | Pick up spent shells before leaving blinds. |

Although the present invention has been described and illustrated with respect to a preferred embodiment and a preferred use therefor, it is not to be so limited since modifications and changes can be made therein which are within the full intended scope of the invention.

I claim:

1. A method of training a plurality of ducks to fly within a duck hunting region of a duck shooting resort layout and not outside said duck hunting region, said method comprising the steps of:

(a) providing said plurality of ducks and providing said duck shooting resort layout, said duck shooting resort comprising a body of water and a peripheral embankment encircling and containing said body of water; said duck hunting region being within said duck shooting resort layout and including at least a portion of said body of water;

then (b) releasing said plurality of ducks into said duck shooting resort layout; then (c) feeding said ducks within said duck hunting region on successive days while accompanying said feeding with a certain loud noise so that said ducks come to associate said loud noise with said feeding; then (d) moving where said feeding of said ducks within said duck hunting region occurs on said successive days to different locations within said duck hunting region.

2. The method as recited in claim 1, in which the step of releasing said plurality of ducks into said duck shooting resort layout occurs when said plurality of ducks are less than twelve weeks old.

* * * * *